(12) United States Patent
Manzula et al.

(10) Patent No.: US 11,294,132 B2
(45) Date of Patent: Apr. 5, 2022

(54) SPLICE DISTRIBUTOR HAVING A SPLICE COMPARTMENT

(71) Applicant: Phoenix Contact GmbH & Co. KG, Blomberg (DE)

(72) Inventors: Evgenij Manzula, Bielefeld (DE); Frank Koelske, Drensteinfurt (DE); Vladimir Polozun, Ottenstein (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 0 days.

(21) Appl. No.: 16/771,228

(22) PCT Filed: Dec. 11, 2018

(86) PCT No.: PCT/EP2018/084354
§ 371 (c)(1),
(2) Date: Jun. 10, 2020

(87) PCT Pub. No.: WO2019/115523
PCT Pub. Date: Jun. 20, 2019

(65) Prior Publication Data
US 2021/0181444 A1 Jun. 17, 2021

(30) Foreign Application Priority Data

Dec. 12, 2017 (DE) .................... 10 2017 129 646.8
Dec. 11, 2018 (DE) .................... 10 2018 131 734.4

(51) Int. Cl.
*G02B 6/44* (2006.01)

(52) U.S. Cl.
CPC ......... *G02B 6/4452* (2013.01); *G02B 6/4454* (2013.01)

(58) Field of Classification Search
CPC .......................... G02B 6/4454; G02B 6/4452
See application file for complete search history.

(56) References Cited

U.S. PATENT DOCUMENTS

| | | | | |
|---|---|---|---|---|
| 8,111,966 B2* | 2/2012 | Holmberg | ............ | G02B 6/3897 385/135 |
| 9,383,535 B2* | 7/2016 | Abbiati | ................ | G02B 6/4441 |
| 9,535,226 B2* | 1/2017 | Simmons | ............. | G02B 6/4448 |

(Continued)

FOREIGN PATENT DOCUMENTS

| | | |
|---|---|---|
| DE | 29901046 U1 | 5/1999 |
| EP | 0581306 A1 | 2/1994 |

(Continued)

*Primary Examiner* — Sung H Pak
(74) *Attorney, Agent, or Firm* — Leydig, Voit & Mayer, Ltd.

(57) ABSTRACT

A splice distributor includes: a housing with at least one input opening for receiving an input cable, which includes at least one input optical waveguide and at least one connection opening for receiving at least one connecting optical waveguide, which is connected to the input optical waveguide in the housing in a light-conducting manner; and a splice tray arranged in the housing, which is provided on an upper side of the splice tray for receiving a connecting region of the input optical waveguide and of the connecting optical waveguide. The input opening is arranged at least partially above an upper lateral plane of the splice tray and at least one connection opening is arranged below the upper lateral plane of the splice tray.

15 Claims, 5 Drawing Sheets

(56) References Cited

U.S. PATENT DOCUMENTS

| | | | |
|---|---|---|---|
| 2006/0083475 A1 | 4/2006 | Grubish et al. |
| 2009/0202214 A1 | 8/2009 | Gronvall et al. |
| 2009/0324189 A1 | 12/2009 | Hill et al. |
| 2017/0045699 A1 | 2/2017 | Coan et al. |
| 2017/0153407 A1 | 6/2017 | Schurmans et al. |

FOREIGN PATENT DOCUMENTS

| | | |
|---|---|---|
| EP | 2383594 A1 | 11/2011 |
| FR | 3032533 A1 | 8/2016 |
| JP | 2004198709 A | 7/2004 |
| JP | 2006091819 A | 4/2006 |
| JP | 2008107602 A | 5/2008 |
| WO | 2017001893 A1 | 1/2017 |

\* cited by examiner

SPLICE DISTRIBUTOR HAVING A SPLICE COMPARTMENT

CROSS-REFERENCE TO PRIOR APPLICATIONS

This application is a U.S. National Phase application under 35 U.S.C. § 371 of International Application No. PCT/EP2018/084354, filed on Dec. 11, 2018, and claims benefit to German Patent Application No. DE 10 2017 129 646.8, filed on Dec. 12, 2017 and to German Patent Application No. DE 10 2018 131 734.4, filed on Dec. 11, 2018. The International Application was published in German on Jun. 20, 2019 as WO 2019/115523 under PCT Article 21(2).

FIELD

The invention relates to a splice distributor having a splice tray which is arranged in a housing of the splice distributor.

BACKGROUND

Splice distributors are used to fan out the optical waveguides of a multicore optical fiber cable and thus to allow the individual optical waveguides to be connected. A splice tray is used for the protected storage of a connection area between the optical waveguides of an incoming optical fiber cable and the connecting optical waveguides (so-called pigtails) connected by optical welding (so-called splicing).

As described in EP 0 581 306 A1, guide elements may be provided in the housing of a splice distributor to facilitate laying of the optical fibers in the housing, for example after splicing the optical fibers.

In the technique described in EP 0 581 306 A1, however, difficulties can arise from the fact that the optical waveguides are laid in loops on the housing base in a plane between the connections. This makes a compact embodiment and handling of the splice distributor particularly difficult when it is used with multicore optical fiber cables.

DE 29 901 046 U1, in contrast, describes a splice distributor for connections between the individual optical waveguides of an incoming optical fiber cable and connecting optical waveguide pre-assembled with a plug coupling, i.e. a so-called pigtail. In this case, a holder is provided for the connecting regions between the optical waveguides on a support above the cable input and the connections.

In splice distributors of the type described in DE 29 901 046 U1, however, difficulties may arise when used with multicore optical fiber cables because the optical waveguides are routed back and forth several times between different planes. This makes it difficult to design the splice distributor in a space-saving manner without simultaneously impairing handling when used with multicore cables or causing an undesired high risk of breakage for the optical waveguides.

SUMMARY

In an embodiment, the present invention provides a splice distributor, comprising: a housing with at least one input opening configured to receive an input cable, which comprises at least one input optical waveguide and at least one connection opening configured to receive at least one connecting optical waveguide, which is connected to the input optical waveguide in the housing in a light-conducting manner; and a splice tray arranged in the housing, which is provided on an upper side of the splice tray for receiving a connecting region of the input optical waveguide and of the connecting optical waveguide, wherein the input opening is arranged at least partially above an upper lateral plane of the splice tray and at least one connection opening is arranged below the upper lateral plane of the splice tray.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
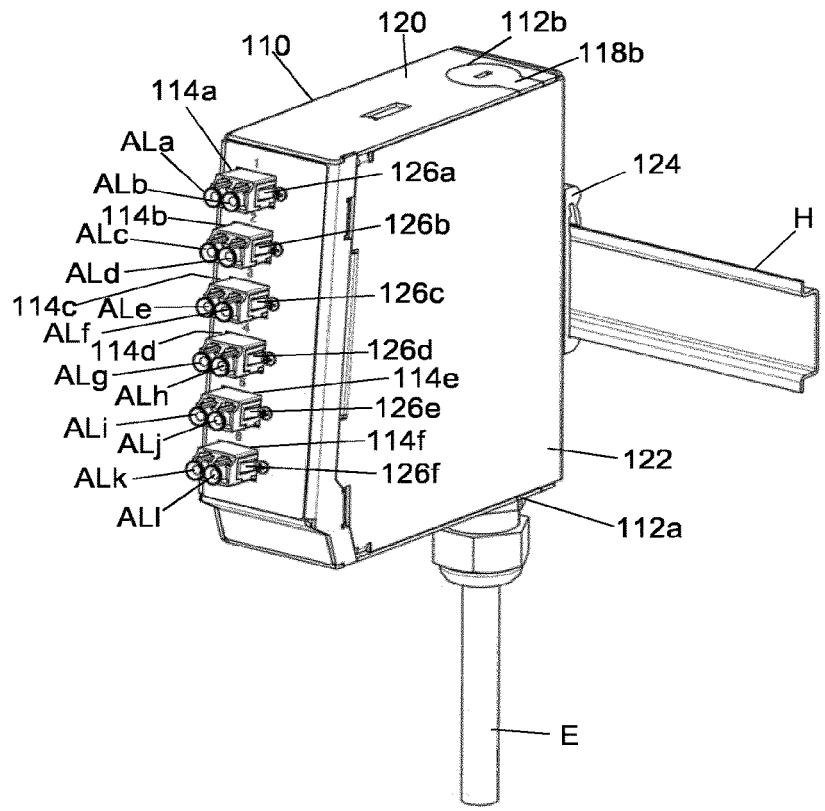
FIG. 1 shows a schematic illustration of a splice distributor in accordance with an exemplary embodiment.

In an embodiment, the present invention provides a splice distributor which allows space-saving execution and simple handling and at the same time reduces the risk of damage to optical waveguides connected therein.

Accordingly, the housing of the splice distributor has at least one input opening for receiving an input cable, which comprises at least one input optical waveguide, and at least one connection opening for receiving a connecting optical waveguide, which is connected in a light-conducting manner to the input optical waveguide in the housing, wherein the input opening is arranged at least partially above an upper lateral plane of a splice tray of the splice distributor and the connection opening is arranged below the upper lateral plane of the splice tray.

The input opening receiving the input cable, for example, by passing the input cable through the input opening, is thus arranged at least partially above an upper lateral plane of the splice tray of the splice distributor. The upper lateral plane is defined by the top of the splice tray on which one or more input optical waveguides of the input cable are received. In this case, the input opening is formed on the housing in particular above and adjacent to the upper lateral plane in such a way that a casing tube routed in the upper lateral plane—without curvature in a direction perpendicular to the upper lateral plane—can be routed towards the upper side of the splice tray and can be fastened there, if required, so that input optical waveguides routed in the casing tube do not have to be curved or if necessary only slightly, but preferably not into several different directions of curvature.

The input optical waveguides to be connected to the connecting optical waveguides are received at the upper side (formed by a flat bottom of the splice tray) of the splice tray. The upper side defines the upper lateral plane. The input opening is arranged at least partially above the upper lateral plane of the splice tray and at least one connection opening is arranged below the upper lateral plane, which means that the input opening is at least partially—viewed along a height direction perpendicular to the upper lateral plane—on a first, upper side of the splice tray (namely the surface section of the splice tray forming the upper side) while at least one connection opening is arranged on a second, lower side of the splice tray facing away from the first side. At the first, upper side, the splice tray can receive at least one input optical waveguide of an input cable received at the input opening, wherein at least one input optical waveguide is connected at least one connecting optical waveguide and routed from the first, upper side of the splice tray to the second, lower side to at least one connection opening underneath the upper lateral plane of the splice tray.

An input cable received in the housing of the splice distributor preferably extends through the input opening and, at least with its casing tube, to the splice tray, so that input optical waveguides enclosed in the casing tube are routed without stress from the input opening to the splice tray and are received there.

In one embodiment, the splice tray has at least one fastening device for fastening a casing tube of the input cable routing at least one input optical waveguide. By means of such a fastening device, the casing tube can be fastened to the splice tray, for example by using cable ties arranged on the fastening device or by means of a screw fastening or the like.

The connecting optical waveguide can comprise an optical waveguide section which is pre-assembled at one end with a connector. In addition, the connecting optical waveguide may be pre-assembled with respect to a length of the optical waveguide section. The connecting optical waveguide may comprise a pigtail. When the splice distributor is used, the open end of the connecting optical waveguide can be led to the splice tray in order to connect the open end to the input optical waveguide.

Receiving the input cable may comprise passing the input cable through the input opening. Additionally or alternatively, the receiving of the input cable may comprise a fastening of the input cable to the housing by means of a cable screw connection. The receiving of the connecting optical waveguide may comprise passing the connecting optical waveguide through the connection opening. Additionally or alternatively, the receiving of the connecting optical waveguide may comprise a fastening of the connection optical waveguide to the connection opening, in particular by means of a receptacle connector which is arranged on the connection opening.

The splice tray may have a border around at least 50 percent of the splice tray circumference. In particular, the splice tray may have the border around at least 80 percent of its circumference. The border may at least partially project beyond an edge area of the upper side of the splice tray. The border can be provided for the horizontal and/or vertical guidance of the input optical waveguide and/or of the connecting optical waveguide. Such a border may, for example, be connected to a fastening device for fastening the casing tube of the input cable to the splice tray so that input optical waveguides emerging from the casing tube can be passed through the border circumferentially at the splice tray.

The splice distributer may comprise at least one splice holder arranged at the top side of the splice tray. The splice holder can be provided for receiving the connecting area. The splice holder may be provided for receiving and fixing the protected splice connection.

The splice tray may be releasably attached to the housing by means of a reversible fastener. In particular, the splice tray can be fastened to the housing by means of only one reversible fastener. The reversible fastener may comprise a screw.

In one embodiment, the splice tray has a fastening region for fastening to the housing. The fastening region is preferably arranged below the upper lateral plane of the splice tray, i.e. it is lowered with respect to the upper lateral plane and is, for example, integrally formed with the splice tray. The reversible fastener, for example in the form of a screw, can be arranged on the fastening region in order to connect the splice tray (detachable) to the housing.

The fact that the fastening region is arranged below the upper lateral plane of the splice tray prevents the fastening region and a fastener arranged thereon from colliding with an input cable, in particular the casing tube and input optical waveguides routed therein, which could otherwise possibly lead to pinching or curvature at the input optical waveguides of the input cable. The fastening region, for example in the form of a lug projecting from the splice tray and lowered relative to the upper lateral plane, is thus separated spatially (along the height direction extending perpendicular to the upper lateral plane) from the upper side of the splice tray where the input optical waveguides are to be received.

The fastening region may be designed to be fastened to a support lug arranged on an inside of the housing. In this case, the fastening region can be designed to be screwed onto the support lug by means of only one screw. In order to support the splice tray, the splice distributor may further comprise at least two side supports which are arranged on different sides of the housing. The side supports and the support lug can form a three-point support for the splice tray. The splice tray may comprise at least two insertion tabs. Each of the insertion tabs may be designed to engage a receptacle on one of the side supports when the splice tray is fastened to the housing. This can promote a stable arrangement of the splice tray in the housing, in particular when the splice tray is fastened to the housing by means of only one reversible fastener. In addition, a mechanical stability of the splice distributor can thus be increased, in particular by forming a strut of the housing by means of the splice tray.

The splice distributor may comprise at least one ramp extending between the upper lateral plane of the splice tray and a region below the splice tray. The ramp can be provided as a guide for the connecting optical waveguide between the upper side of the splice tray and the region below the splice tray. The ramp is preferably integrally formed on the fastening region and extends from the fastening region (arranged below the upper lateral plane) downwards at an angle to the height direction, i.e. away from the splice tray. In this way, the ramp is also spatially separated from the upper side of the splice tray, so that a collision of the ramp and optical waveguides routed thereon with an input cable received at the input opening and routed towards the splice tray is avoided.

The ramp may be designed as part of the splice tray. The ramp may be arranged adjacent to the fastening region of the splice tray. In addition, the ramp may be arranged in a lowered position with respect to the upper side of the splice tray.

The splice distributor may comprise at least one fastener arranged in an area of the input opening in the housing and which is provided for fastening at least one inner member of the input cable. The fastening element can be arranged below the upper lateral plane of the splice tray. The fastening element can be arranged at a distance from a base of the housing. The fastening element can be releasably fastened to the housing by means of a reversible fastener. The fastener may comprise a screw and a blind rivet nut. In this case, the fastening element can be clamped in particular to an associated inner element of the input cable using the fastener, so that the inner element is clamped to the housing via the fastening element and is thus connected to the housing in a load-bearing manner.

In one embodiment, the splice distributor may have two fastening elements by means of which two inner elements, for example on the one hand in the form of a braided sheath (for example a Kevlar or glass fiber mesh) of the input cable and on the other hand in the form of a tension element (in the form of a fiber, for example a plastic or glass fiber) incorporated in the input cable, can be fastened to the housing. A two-fold strain relief for the tension-resistant connection of the input cable to the housing can thus be provided via the two fastening elements, wherein, for example, the fastening elements each act in a clamping manner on the associated inner element and thus fasten it to the housing so that it can be subjected to tension.

The housing may comprise at least two input openings arranged on different sides of the housing. The splice distributor may comprise at least two fastening elements and at least two ramps. In particular, the input openings can be arranged on opposite sides of the housing. In this case, the fastening elements and the ramps can be arranged at least substantially symmetrically in the housing with respect to a housing plane between the input openings. This arrangement enables not only the insertion of a cable from different housing sides, but also, for example, cable connection applications using a plurality of cables to be connected (e.g. a 2 cable solution, in particular a so-called drop insert, a going through solution or an intrusion solution).

In a so-called 2 cable solution, two cables are inserted into the housing from different sides. The input optical waveguides of the cables are each led on the splice tray and connected with each other and/or with connecting optical waveguides.

For example, in a so-called drop insert solution, two cables are inserted into the housing from different sides. The input optical waveguides are each led to the splice tray. Some input optical waveguides of the cables are connected to one another and thus spliced together, other input optical waveguides are connected to connecting optical waveguides and thus diverted from the input cables.

In another embodiment of a 2-cable solution in the sense of a so-called going-through solution, two cables are inserted into the housing from different sides. The input optical waveguides of the cables can be led on the splice tray and connected to one another by splicing the cables together. In this case, the cables are thus not connected to connecting optical waveguides, but rather to one another.

In yet another embodiment of a 2-cable solution in the sense of a so-called intrusion solution, a cable is passed through two input openings. In the interior of the housing, the sheathing of the cable is removed, and one or more (but not all) input optical waveguides are led out of the casing tube and connected to associated connecting optical waveguides.

The splice distributor comprises a plurality of connection openings. The splice distributor may have more than 5 connection openings. In particular, the splice distributor 12 may comprise connection openings. At least one connection opening can also be provided with at least one receptacle connector for receiving the connecting optical waveguide. In particular, each of the connection openings can be provided with two receptacle connectors. The receptacle connector can be designed to form a plug connection with the connector of the connecting optical waveguide. The receptacle connector can also be provided for leading a connection of the connecting optical waveguide from the housing of the splice distributor.

The splice tray may be at least substantially symmetrical with respect to a central plane of the splice tray.

The housing can have a removable closure on at least one of the input openings.

The housing may comprise a housing cassette and a housing cover. The housing cover may be releasably fastened to the housing cassette by means of at least one reversible fastener.

The splice distributor may comprise a hat rail mount. The hat rail receptacle can be arranged on the inside of the housing cover.

An assembly comprises, for example, a splice distributor and an input cable arranged thereon. The input cable comprises, for example, a casing tube and at least one input optical waveguide routed in the casing tube. For example, the input cable can be received using a sheathing at the input opening of the splice distributor and fastened to the housing using the sheathing. The casing tube extends between the input opening and the splice tray, which thus leads at least one input optical waveguide routed in the casing tube to the splice tray and is fastened to the splice tray, for example by means of a fastening device, for example using cable ties.

FIG. 1 shows a schematic illustration of a splice distributor 100 in accordance with one exemplary embodiment. The splice distributor 100 comprises a housing 110 having a housing cassette 120 and a housing cover 122. The housing 110 has input openings 112a 112b on different sides of the housing cassette 120 for receiving an input cable E. In the example shown, the input cable E is a multicore fiber optic cable received in the input opening 112a and fastened to the housing 110 by means of a cable screw connection. The other input opening 112b is closed by means of a removable closure 118b in the example shown.

The splice distributor 100 also comprises a plurality of connection openings 114a-114f for receiving at least one connecting optical waveguide. In the example shown, the splice distributor 100 comprises six connection openings 114a-114f which are each provided for receiving two connecting optical waveguides. In the example shown, each of the connection openings 114a-114f is provided with a receptacle connector 126a-126f.

In the example shown, the housing 110 has a top-hat rail mount 124 on its rear side, by means of which the splice distributor 100 can be fastened to a top-hat rail H.

Here, the splice distributor 100 is described as a distributor for a multicore input cable. However, this is not to be understood as a limitation with regard to the direction in which light signals pass through the splice distributor 100. For example, the splice distributor 100 may function as a combiner for light signals entering the housing 110 from the direction of the connection openings 114a-114f. It is understood that the described advantages of the invention can be achieved independently of a direction of passage of the light signals.

Input optical waveguides ELa-ELI of the input cable E and connecting optical waveguides ALa-ALI, which are received in the connection openings 114a-114f of the splice distributor 100, are connected to each other in a light-conducting manner in connecting regions V. For this purpose, the ends of the ALa-ALI connecting optical waveguides opposite the connection openings 114a-114f are led from the region below the splice tray 130 to the upper side 132 of the splice tray 130. Furthermore, two splice holders 138a, 138b for fastening the connection regions V are arranged on the upper side 132 of the splice tray 130.

Input optical waveguides ELa-ELI of the input cable E and connecting optical waveguides ALa-ALI, which are received in the connection openings 114a-114f of the splice distributor 100, are connected to each other in a light-conducting manner in connection regions V. For this purpose, the ends of the ALa-ALI connecting optical waveguides opposite the connection openings 114a-114f are led from the region below the splice tray 130 to the upper side 132 of the splice tray 130. Furthermore, two splice holders 138a, 138b for fastening the connection regions V are arranged on the upper side 132 of the splice tray 130.

Figure 2:
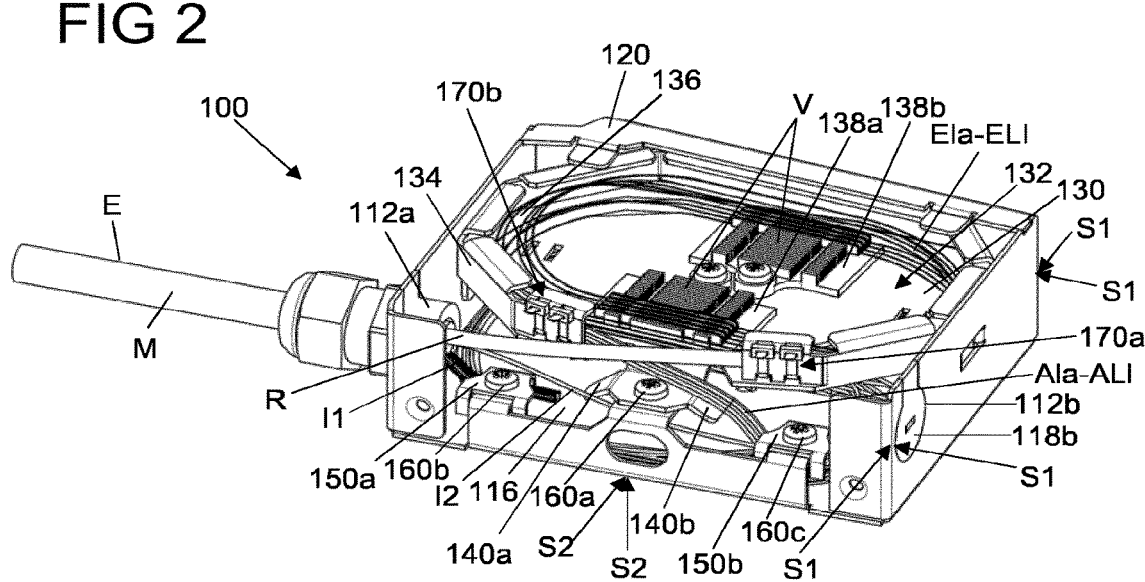
FIG. 2 shows a schematic illustration of a splice distributor with an open housing and optical waveguides connected therein in accordance with an example.

The illustrated arrangement of the input openings 112a 112b and the splice tray 130 prevents the input optical waveguides ELa ELI of the input cable E from having to be directed onto a splice tray located at their input plane. Curvatures of the input optical waveguide bundle in different directions can thereby be avoided. As also shown in FIG. 2, this arrangement allows a casing tube R, which is provided in the input cable E to protect the input optical waveguides ELa-ELI, to be led up to the splice tray 130 without excessive material stress. This promotes protection of the input optical waveguides ELa-ELI within the housing 110 and simplifies handling of the splice distributor 100, especially with regard to laying the optical waveguides in the housing cassette 120.

In the illustrated embodiment, the splice tray 130 comprises fastening devices 170a, 170b projecting from the upper side 132 as chamfers for fastening the casting tube R of the input cable E to the splice tray 130. In the arrangement in accordance with FIG. 2 the casing tube R of the input cable E is accordingly fastened to the fastening device 170a shown on the right in FIG. 2 by means of cable ties, so that the casing tube R extends between the input opening 112a and the splice tray 130 without tension and is fastened to the splice tray 130 by the fastening device 170a.

The input cable E comprises a sheath M which is fasted to the housing 110 in the region of the input opening 112a and ends in the region of the input opening 112a. Between the input opening 112a and the splice tray 132, the casing tube R (outside the splice distributor 100 enclosed in the casing M) extends freely and leads the input optical waveguides ELa-ELI enclosed therein from the input opening 112a to the splice tray 130.

The laying of the input optical waveguides ELa-ELI and the connecting optical waveguides ALa-ALI largely in separate regions allows simple handling of the splice distributor 100, especially when used with multicore input cables E. At the same time, the risk of breakage of the optical waveguides is reduced. In particular, this enables a compact embodiment of the splice distributor 100 also for multicore input cables and their fanning out of a plurality of connections.

In the example shown, splice distributor 100 is intended for use with pre-assembled connecting optical fibers ALa-ALI, which are each provided with a connector at one end, i.e. so-called pigtails. In addition, each of the pre-assembled ALa-ALI connecting optical waveguides, for example, comprises an optical waveguide section of predetermined length. The dimensions of the splice distributor 100 and the components described can be adapted to a number of provided connections and the pigtails to be used.

Figure 3:
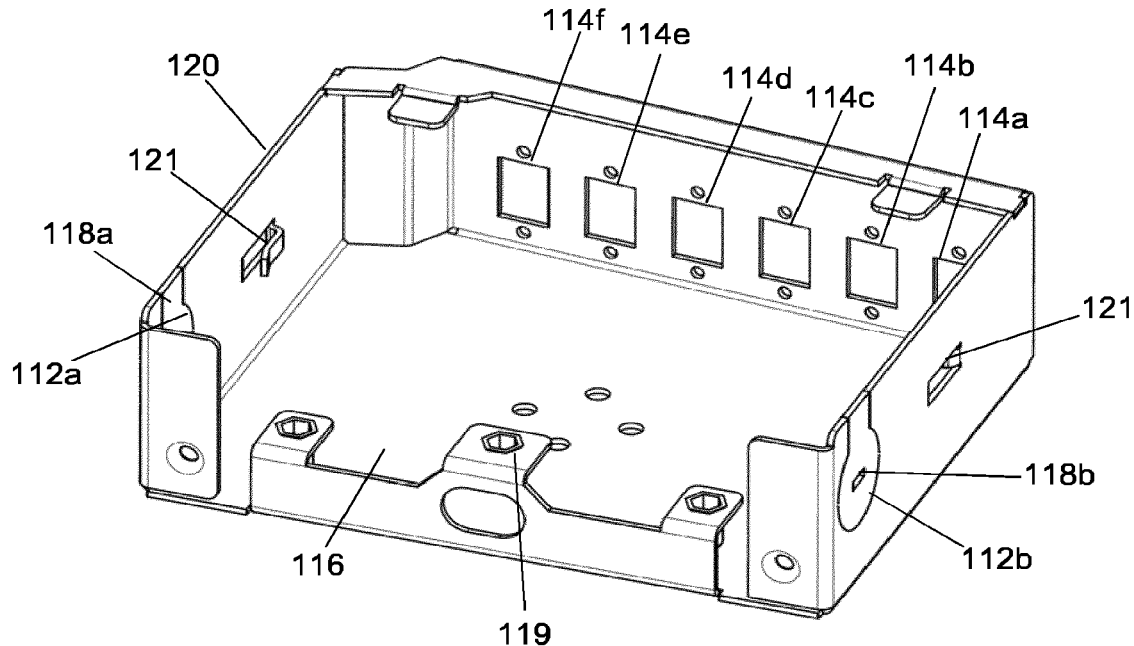
FIG. 3 shows schematic illustration of a housing cassette of a splice distributor in accordance with an example.
Figure 5:
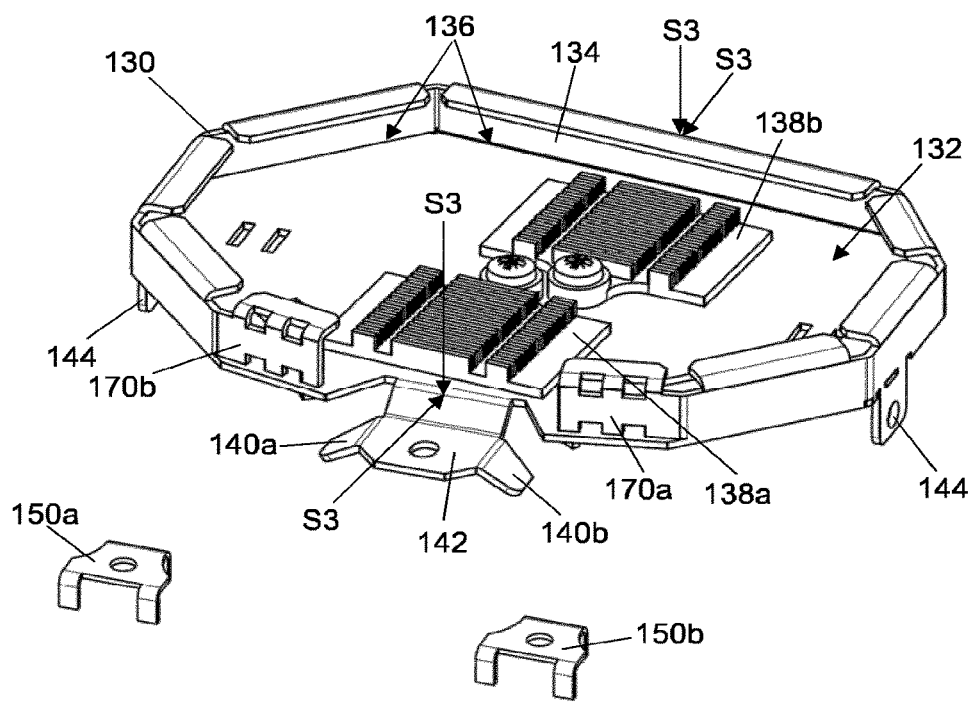
FIG. 5 shows a schematic illustration of a splice tray and two fastening elements of a splice distributor in accordance with an example.

The splice tray 130 is releasably fastened to the housing cassette 120 by a reversible fastener 160a, such as a screw. To this end, the splice tray 130 has, as shown in FIG. 5, a fastening region 142 which can be placed and screwed onto a support lug 119 on a side wall of the housing cassette 120 as shown in FIG. 3. The housing cassette 120 also comprises side supports 121 on various sides, as shown in FIG. 3, which serve as additional supports for the splice tray 130. Specifically, the side supports 121 are each formed with a receptacle connection that engages with a receptacle lug 144 of the splice tray 130 as shown in FIG. 5. The use of only one fastener 160a for fastening the splice tray 130 facilitates easy handling of the splice distributor 100. At the same time, the provision of a multipoint support, for example a three-point support, with the additional side supports 121 promotes mechanical stability of the splice distributor 100. The splice tray 130 additionally promotes strut of the housing cassette 120 by means of the receptacle lugs 144. In addition, the receptacle lugs 144, together with the side supports 121, provide guidance when inserting the splice tray 130 into the housing cassette 120.

The splice tray 130 can be separated from the housing cassette 120, for example, in order to mount and lay the optical waveguides. This particularly simplifies the laying of the connection optical waveguides ALa ALI in the region below the splice tray 130. After the connecting optical waveguides ALa ALI have been laid and the splice tray 130 is inserted, the splice tray 130 can be fastened in the housing cassette 120 using the fastener 160a. As shown in FIG. 2, the casing tube R can be fastened to an associated fastening device 170a, 170b of the splice tray 130 by means of one or more cable ties and the input optical waveguides ELa ELI can be laid.

The splice tray 130 has a border 134 on its surface 132. The border 134 serves as a guide for the optical waveguides laid on the upper side 132 of the splice tray 130 in the horizontal direction. This simplifies the laying of the optical waveguides and at the same time reduces the risk of pinching the optical waveguides when the splice tray 130 is inserted into the housing cassette 120 after mounting the optical waveguides. As shown in FIG. 1, the described arrangement of input openings 112a, 112b, connection openings 114a-114f and the splice tray 130 allows the border 134 to nearly completely encircle the surface 132 of the splice tray 130.

The border 134 also projects beyond an edge region 136 of the upper side 132 of the splice tray 130. As a result, the border 134 provides guidance of the optical waveguides laid thereon also in the vertical direction. In this way, the laying of the optical waveguides is further simplified. In addition, the risk of damage to the optical waveguides is further reduced if the splice tray 130 is mounted in the housing cassette 120, if the housing cassette 120 is closed by means of the housing cover 122 or if later maintenance work is carried out on the splice distributor 100.

The splice tray 130 also comprises two ramps 140a, 140b adjacent to the fastening area 142. Ramps 140a, 140b are used to route optical waveguides between the upper side 132 of the splice tray 130 and the region underneath the splice tray 130. This further simplifies the laying of the optical waveguides. In addition, ramps 140a, 140b can be used to avoid a transition edge, thus reducing the risk of breakage of the optical waveguides. In the example shown, the fastening area 142 and the ramps 140a, 140b are also lowered in relation to the upper side 132 of the splice tray 130. This reduces, for example, the risk of crushing or jamming of the ALa-ALI connecting optical waveguides, e.g. by the casing tube R, in particular when the housing cover 122 is mounted. The lowering of the ramps 140a 140b with respect to the upper side 132 is, for example, between 5 and 10 meters.

The splice distributor 100 comprises at least two fastening elements 150a, 150b, each arranged in a region close to one of the input openings 112a, 112b. The fastening elements 150a, 150b are provided for strain relief of the input optical waveguides ELa-ELI. To this end, each of the fastening elements 150a, 150b is releasably fastened to the housing cassette 120 by means of a reversible fastener 160b, 160c, for example a screw. As shown in FIG. 2, each of the fastening elements 150a, 150b is designed for fastening one or more inner elements I1, I2 of the input cable E. Typical internal elements of glass fiber cables that can be fastened for strain relief comprise, for example, aramid yarn, glass roving or GFC elements.

In the exemplary embodiment shown, the fastening elements 150a, 150b are used, in particular, to fasten an inner element I1, I2 of the input cable E in a tensionally fixed manner to the housing 110. Thus, an inner element I1 in the form of a braided sheath of the input cable E is fastened to the housing 110 using fastening element 150a in the arrangement in accordance with FIG. 2. In contrast, an inner element I2 in the form of a fiber element that can be subjected to tension, e.g. a glass or plastic fiber enclosed in the input cable E for strain relief, is fastened to the housing 110 via the fastening element 150b.

The fastening elements 150a, 150b are arranged below the upper lateral plane S1 of the splice tray 130 and above a base 116 of the housing cassette 120. The arrangement below the upper lateral plane s1 simplifies the laying of the input optical waveguides ELa-ELI as well as the mounting of the splice tray 130. At the same time, the arrangement above base 116 makes it easier to lay the ALa-ALI connecting optical waveguides. For example, a region between the base 116 and the fastening elements 150a, 150b in the housing cassette 122 can thus be kept free of fastening elements that could impede the laying of the ALa-ALI connecting optical waveguides. In some examples, the fasteners 160b, 160c each comprise a screw and a blind rivet nut. The use of blind rivet nuts in the region between the base 116 and the fastening elements 150a 150b reduces the risk of damage to optical waveguides laid in this region by the screws 160b 160c.

The splice distributor 100 comprises two input openings 112a, 112b on opposite sides of the housing cassette 122. This allows the input cable E to be supplied optionally from different directions. In the case of the splice distributor 100, such optional feeding from opposite directions is also favored by at least a substantially symmetrical arrangement and embodiment of the fastening elements 150a, 150b and the splice tray 130 including the ramps 140a, 140b with respect to a housing plane S2 between the input openings 112a, 112b. If the input cable E is fed through the input opening 112b in a different way from the example shown, e.g. both the input optical waveguides ELa-ELI and the connecting optical waveguides ALa-ALI can be laid in loops from the opposite direction. In this case, the ends of the connecting optical waveguides ALa-ALI can, for example, be routed over the ramp 140a between the upper side 132 and the region below the splice tray 130. In addition, in some examples of the splice distributor 100, each of the input openings 112a, 112b is provided with a closure 118a, 118b. A user of the splice distributor 100 can choose in individual cases between feeding the input cable E through the input opening 112a or the opposite input opening 112b and only remove the corresponding closure 118a, 118b at the selected input opening. Leaving the closure 118a, 118b at the unused input opening 112a, 112b increases the protection provided by the housing 110.

FIG. 3 shows a schematic illustration of a housing cassette 120 of a splice distributor 100 as described above. FIG. 3 shows the connection openings 114a-114f, which are located in a lower region of the housing cassette 120. In addition, FIG. 3 shows that in the region between the base 116 and a fastening area for the fastening elements 150a, 150b, there is a region free of fastening elements, which favors the laying of connecting optical waveguides in the housing cassette 120. Furthermore, each of the input openings 112a, 112b is closed by means of a closure 118a, 118b on the depicted housing cassette 120.

Figure 4:
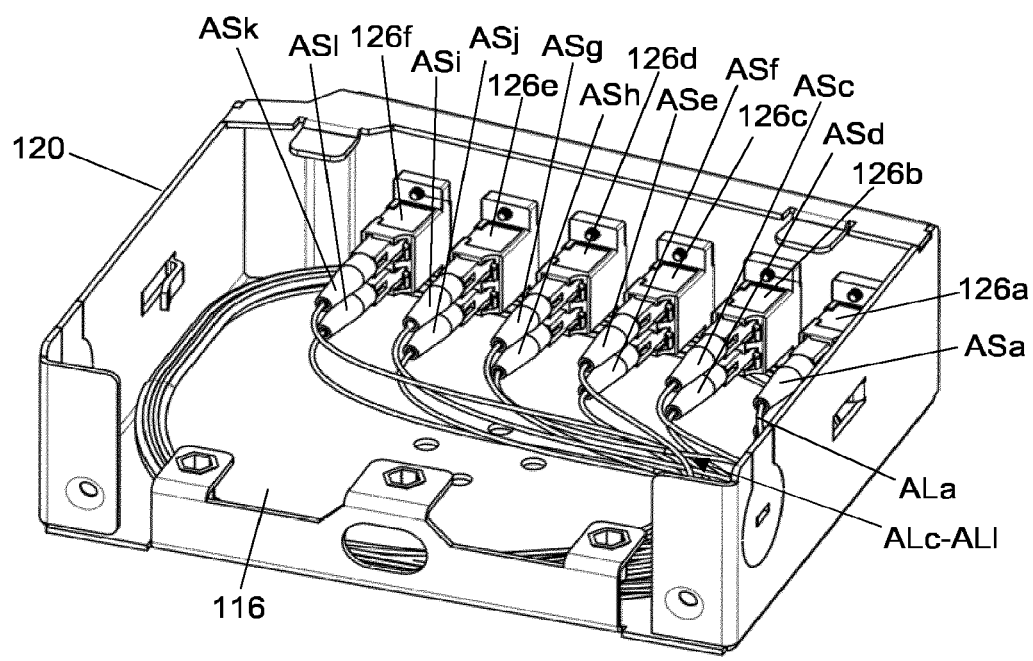
FIG. 4 shows a schematic illustration of a housing cassette of a splice distributor with connecting optical waveguides arranged therein in accordance with an example.

FIG. 4 shows a schematic view of the housing cassette 120 from FIG. 3. In contrast to the illustration in FIG. 3, in the example shown in FIG. 4 the connection openings 114a-114f are each provided with a receptacle connector 126a-126f In addition, two connecting optical waveguides in the form of so-called pigtails ALa-ALI are connected to each of the 126a-126f receptacle connectors. Each of the connecting optical waveguides ALa-ALI is pre-assembled with a connector ASa-ASI at one end. The connecting optical waveguides ALa-ALI are laid on the base 116 between the lateral walls of the housing cassette 120.

FIG. 5 shows a schematic illustration of a splice tray 130 and two fastening elements 150a, 150b of a splice distributor 100 as described above. The splice tray 130 is at least substantially symmetrical with respect to a central plane S3. In addition, two splice holders 138a, 138b are arranged on the upper side 132 of the splice tray 130. FIG. 5 also shows the border 134 of the splice tray 130, which almost completely surrounds the upper side 132 and partially projects beyond an edge region 136 of the upper side 132.

Figure 6:
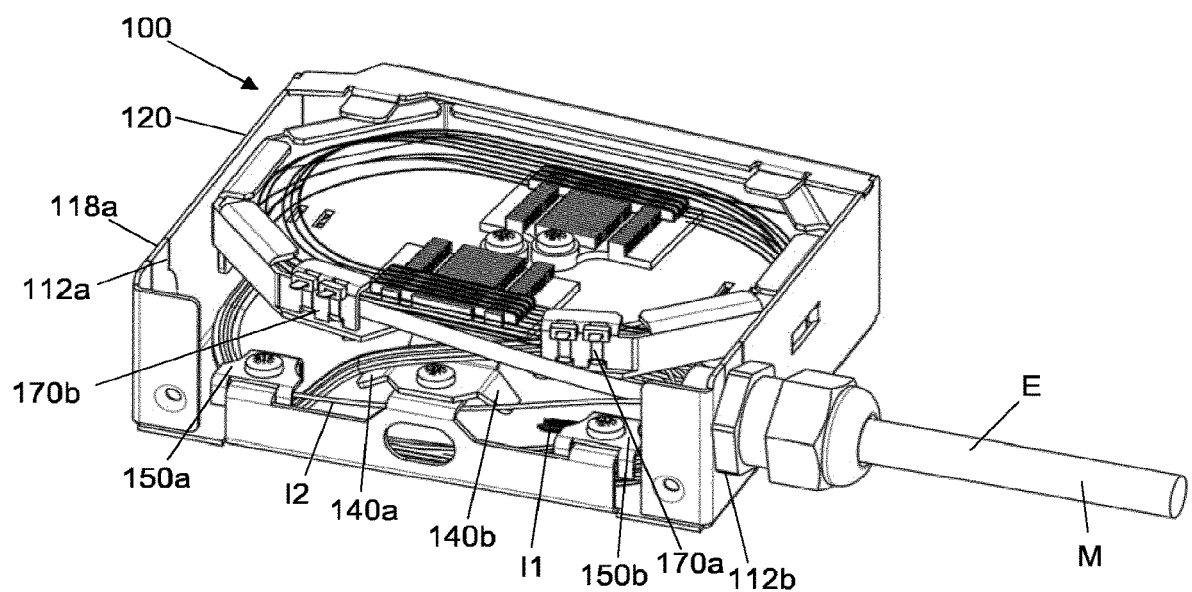
FIG. 6 shows a schematic illustration of a splice distributor with an open housing and optical waveguides connected therein in accordance with another example.

FIG. 6 shows a splice distributor 100 in accordance with another example. The splice distributor 100 from FIG. 6 substantially corresponds to the example shown in FIG. 2. In contrast to the example in FIG. 2, however, in the splice distributor 100 from FIG. 6, the input cable E is not fed through the input opening 112a, but through the opposite input opening 112b. Accordingly, a closure of the input opening 112b is removed, while a closure 118a is present at the input opening 112a.

As described in connection with FIG. 2, in the example of FIG. 6 both the input optical waveguides and the connecting optical waveguides are laid in the housing cassette 120 in a direction opposite to the example in FIG. 2. In addition, in contrast to the example in FIG. 2, the various inner elements I1, I2 of the input cable E are attached to the other one of the fastening elements 150a, 150b respectively, and the optical waveguides are routed via ramp 140a instead of ramp 140b.

Figure 7:
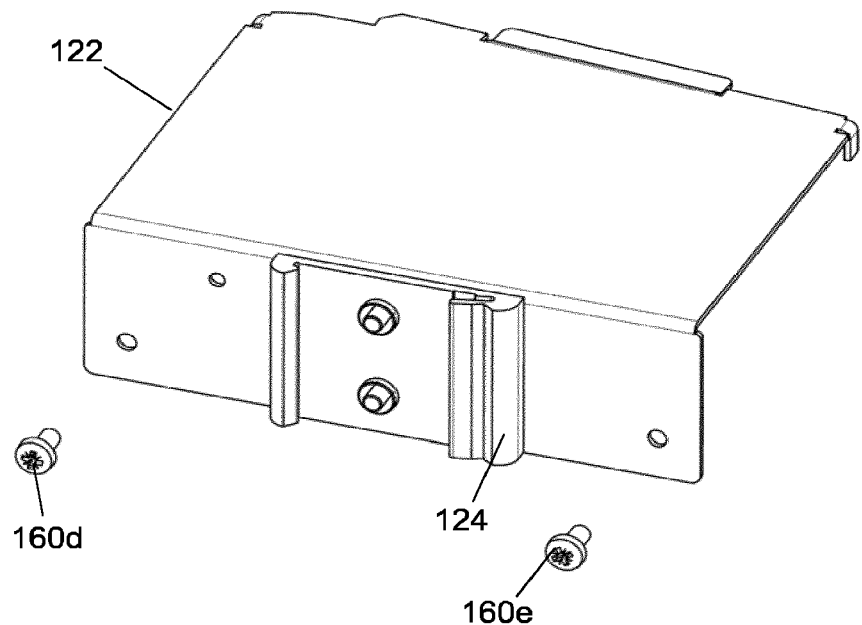
FIG. 7 shows a schematic illustration of a housing cover and two fasteners of a splice distributor in accordance with an example.

FIG. 7 shows a schematic illustration of a housing cover 122 and two screws 160d, 160e for releasably fastening the cover 122 to the housing cassette 120 of the splice distributor 100, as described above. The housing cover 122 has a top-hat rail mount 124 on one rear side. This enables the splice distributor 100 to be fastened to a top-hat rail, as is common in automation technology, for example. Other examples of splice distributor 100, however, comprise additional or different means of fastening the splice distributor 100. In addition, some examples include means for fastening the splice distributor to other sides of the splice distributor, for example to one or more outer sides of the housing cassette 120.

Figure 8:
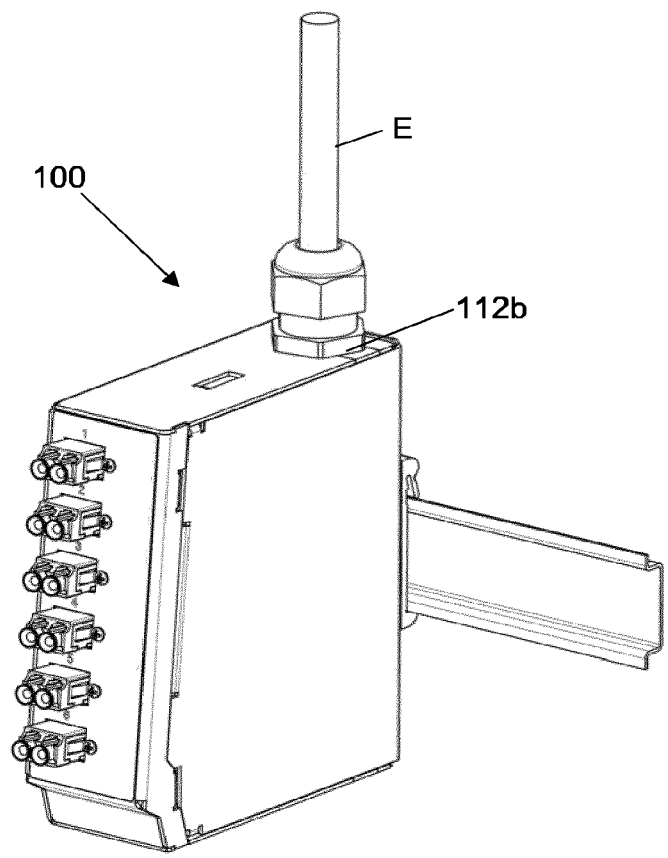
FIG. 8 shows a schematic illustration of a splice distributor in accordance with another example.

FIG. 8 shows a schematic illustration of a splice distributor 100 in accordance with another example. The splice distributor 100 shown in FIG. 8 substantially corresponds to the splice distributor 100 in FIG. 1. In contrast to the example shown in FIG. 1, however, in the splice distributor 100 from FIG. 8 the input cable E is fed through the input opening 112b opposite the input opening 112a. With regard to such a supply of the input cable E through the input opening 112b, the statements made in connection with FIG. 6 apply accordingly.

Figure 9:
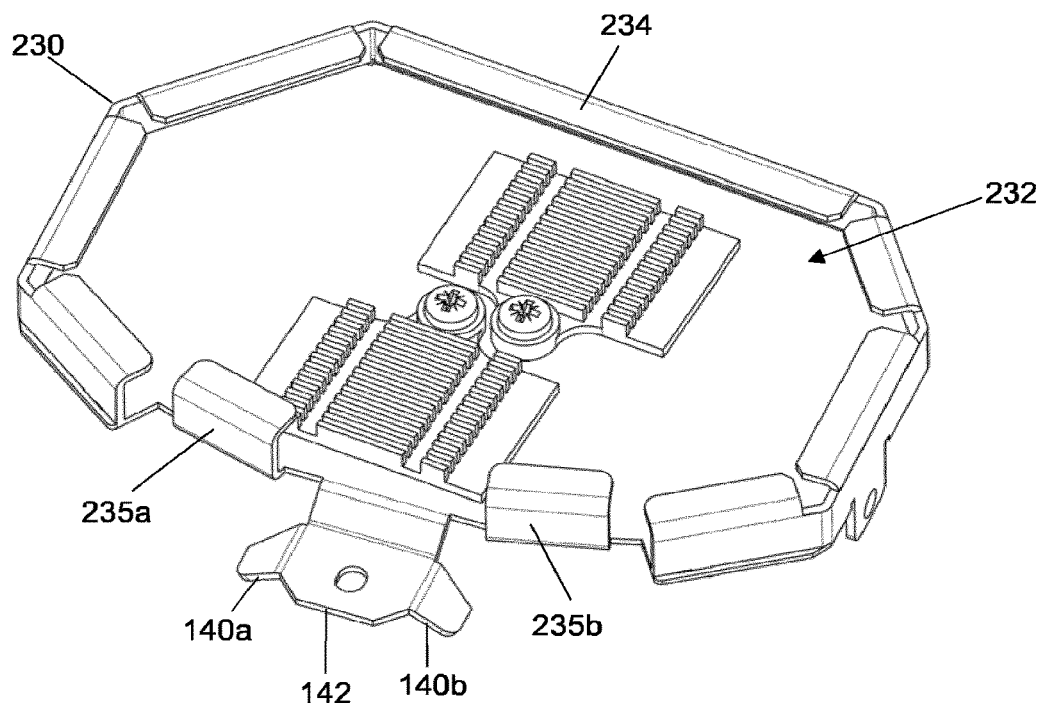
FIG. 9 shows a schematic illustration of a splice tray of a splice distributor in accordance with another example.

FIG. 9 shows a schematic illustration of another example of a splice tray 230 for use in a splice distributor of the type described here. The splice tray 230 may be used instead of the splice tray 130, for example. As far as nothing else results from the following, what has been stated in connection with the splice tray 130 applies accordingly to the splice tray 230.

Similar to the splice tray 130, the splice tray 230 also comprises an upper side 232 and a border 234. The border 234 of the splice tray 230 comprises two border segments 235a, 235b adjacent to the connecting region of the splice tray 230, which are arranged inwards in relation to the remaining border 234. As described below with reference to FIG. 10, the offset arrangement of the border segments 235a, 235b favors handling of the splice distributor in some examples.

Unlike the splice tray 130, the splice tray 230 does not have a symmetrical outline outside the connecting region. The shape of the splice tray 230 is adapted, for example, to an asymmetric interior of a splice distributor housing. In this way, for example, an available interior of the housing is utilized more efficiently and handling of the splice distributor, for example when laying the optical waveguides, is simplified.

Figure 10:
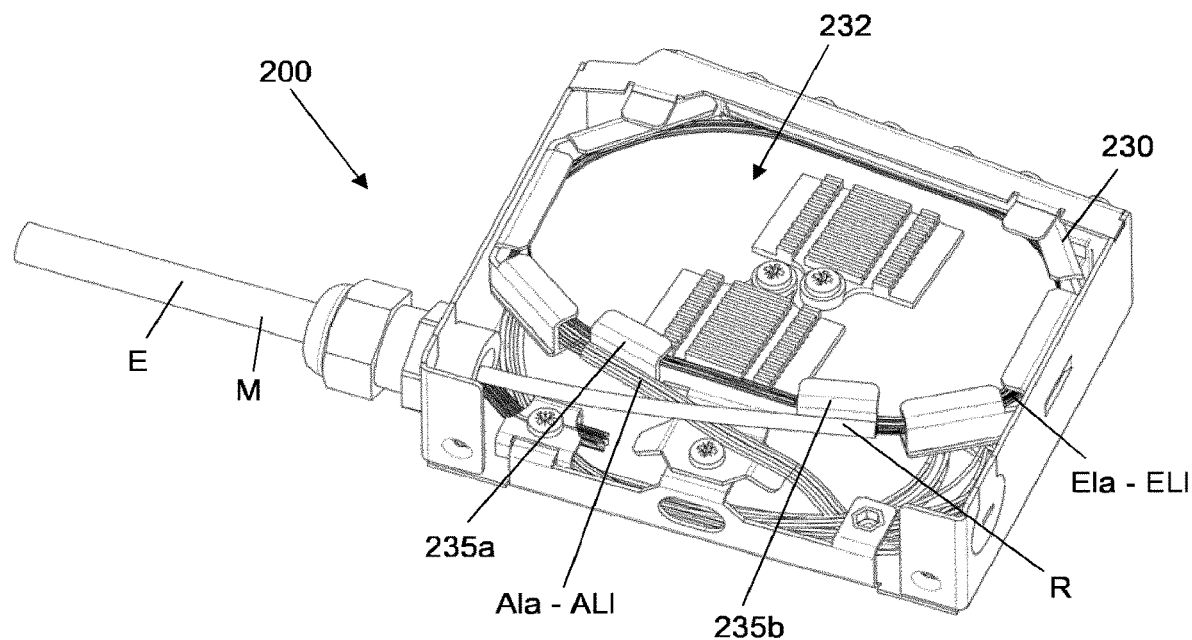
FIG. 10 shows a schematic illustration of a splice distributor with an open housing and optical waveguides laid therein, in accordance with another example.

FIG. 10 shows a splice distributor 200 in accordance with another example. The splice distributor 200 and the configuration shown largely correspond to the example of splice distributor 100 depicted in FIG. 2. As far as nothing else results from the following, what has been stated in connection with FIG. 2 applies accordingly to the splice distributor 200.

In contrast to the splice distributor 100, the splice distributor 200 comprises a splice tray 230 as described in connection with FIG. 9. The shape of the splice tray 230 is adapted to an asymmetric interior of the housing of the splice distributor 200. At the same time, at least the substantial symmetry of splice tray 230 in the connecting region still allows supply of the input cable to be fed in optionally from opposite directions, as in the case of FIGS. 2 and 6.

As shown in FIG. 10, the inwardly arranged border segments 235a, 235b allow the casing pipe R to be routed and connected along an outer side of the border segment 235b, for example by means of a cable tie. This allows the casing tube R to be kept out of a laying region of the optical waveguides on the upper side 232 of the splice tray 230 without having to shorten the casing tube R or to make a considerably stronger curvature of cables or optical waveguides. This promotes both handling of the splice distributor 200 and protection of the installed optical fibers against jamming or damage caused by the casing tube R.

Similarly, the border segment 235a enables the connecting optical waveguides ALa-ALI to be routed along an outer side of the 235a border segment. This promotes the separate laying of different sections of the optical waveguides, which for example have different thicknesses in different sections. Thus, in one example, the input optical waveguides ELa-ELI have a thickness of approximately 250 micrometers when exiting the casing tube R. On the other hand, in the example, each of the connecting optical waveguides ALa-ALI has a thickness of about 900 micrometers in a sheathed region, wherein the thickness is reduced to about 250 micrometers by removing the sheath near the connecting region, for example. The border segment 235a therefore enables the connecting optical waveguides ALa-ALI to be connected in the sheathed section if the sheath is removed appropriately and at the same time the sheathed section is kept out of the laying area of optical waveguide sections with reduced thickness.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Splice distributor
110 Housing
112a 112b Input opening
114a, 114b, . . . , 114f Connection opening
116 Base
118a 118b Closure
119 Support lug
120 Housing cassette
121 Side support
122 Housing cover
124 Top-hat rail mount
126a, 126b, . . . , 126f Receptacle connector
130, 230 Splice tray
132, 232 Upper side 134, 234 Border
235a, 235b Border segment
136 Edge region
138A, 138b Splice holder
140A, 140b Ramp
142 Fastening region
144 Receptacle lug
150a, 150b Fastening element
160a, 160b, . . . , 160e Reversible fastener
170a, 170b Fastening device
ALa, ALb, . . . , ALI Connecting optical waveguide
ASa, ASb, ASI Connector
E Input cable
Ela, ELb, . . . , ELI Input optical waveguide
H Top-hat rail
I1, I2 Inner element
M Sheath
R Casing tube
S1 Upper lateral plane
S2 Housing plane
S3 Central plane
V Connecting region

The invention claimed is:

1. A splice distributor, comprising:
a housing with at least one input opening configured to receive an input cable, which comprises at least one input optical waveguide and at least one connection opening configured to receive at least one connecting optical waveguide, which is connected to the input optical waveguide in the housing in a light-conducting manner; and
a splice tray arranged in the housing, having an upper side that includes a connecting region of the input optical waveguide and the connecting optical waveguide,
wherein the input opening is arranged at least partially above an upper lateral plane of the splice tray and at least one connection opening is arranged below the upper lateral plane and the upper side of the splice tray.

2. The splice distributor according to claim 1, wherein the splice tray comprises a fastening device configured to fasten a casing tube of the input cable which routes at least one input optical waveguide.

3. The splice distributor according to claim 1, wherein the splice tray has a border on at least fifty percent of a circumference of the splice tray, which at least partially projects beyond an edge region of the upper side of the splice tray.

4. The splice distributor according to claim 1, further comprising at least one splice holder which is arranged on the upper side of the splice tray and which is configured to receive the connecting region.

5. The splice distributor according to claim 1, wherein the splice tray is releasably fastened to the housing by a reversible fastener.

6. The splice distributor according to claim 5, wherein the splice tray has a fastening region which is arranged below a top plane of the splice tray and on which the reversible fastener is arranged to fasten to the housing.

7. The splice distributor according claim 1, further comprising at least one support lug and at least two side supports which are arranged on different sides in the housing and which are configured to support the splice tray.

8. The splice distributor according to claim 1, further comprising at least one ramp which extends between an upper lateral plane of the splice tray and a region below the splice tray and which is configured to guide the optical waveguide between the upper side of the splice tray and the region below the splice tray.

9. The splice distributor according to claim 8, wherein the at least one ramp is formed as part of the splice tray.

10. The splice distributor according to claim 1, further comprising at least one fastening element which is arranged in a region of the input opening in the housing and which is configured to fasten at least one inner element of the input cable.

11. The splice distributor according to claim 10, wherein the at least one fastening element is arranged below an upper lateral plane of the splice tray but is spaced from a base of the housing.

12. The splice distributor according to claim 1, wherein the housing has at least two input openings arranged on different sides of the housing, and the splice distributor comprises at least two fastening elements and at least two ramps.

13. The splice distributor according to claim 12, wherein the input openings are arranged on opposite sides of the housing and the fastening elements and the ramps are arranged at least substantially symmetrically in the housing with respect to a housing plane between the input openings.

14. The splice distributor according to claim 12, wherein the housing further comprises a removable closure at least one of the input openings.

15. An assembly, comprising:
the splice distributor according to claim 1; and
the input cable comprising a casing tube and the at least one input optical waveguide routed in the casing tube.

* * * * *